(12) United States Patent
Zhang et al.

(10) Patent No.: US 11,432,140 B2
(45) Date of Patent: Aug. 30, 2022

(54) MULTICAST SERVICE PROCESSING METHOD AND ACCESS POINT

(71) Applicant: Huawei Technologies Co., Ltd., Shenzhen (CN)

(72) Inventors: Lin Zhang, Suzhou (CN); Ya Yang, Suzhou (CN); Xiaojun Wang, Suzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 16/563,682

(22) Filed: Sep. 6, 2019

(65) Prior Publication Data

US 2019/0394639 A1 Dec. 26, 2019

Related U.S. Application Data

(63) Continuation of application No. PCT/CN2018/078441, filed on Mar. 8, 2018.

(30) Foreign Application Priority Data

Mar. 9, 2017 (CN) .......................... 201710138249.2

(51) Int. Cl.
*H04L 29/06* (2006.01)
*H04W 12/041* (2021.01)
(Continued)

(52) U.S. Cl.
CPC ......... *H04W 12/041* (2021.01); *H04L 12/189* (2013.01); *H04L 61/2069* (2013.01);
(Continued)

(58) Field of Classification Search
CPC ............. H04W 12/041; H04W 12/037; H04W 12/0433; H04W 84/12; H04W 88/08;
(Continued)

(56) References Cited

U.S. PATENT DOCUMENTS 5,748,736 A * 5/1998 Mittra .................... H04L 9/0822
713/155
2005/0025160 A1* 2/2005 Meier .................. H04L 12/4641
370/395.53

(Continued)

FOREIGN PATENT DOCUMENTS

CN 1874224 A 12/2006
CN 101145900 A 3/2008
(Continued)

OTHER PUBLICATIONS

IEEE Std 802.11™-2016 (Revision of IEEE Std 802.11-2012), Part 11: Wireless LAN Medium Access Control (MAC) and Physical Layer (PHY) Specifications, IEEE Computer Society, Sponsored by the LAN/MAN Standards, 3534 pages.

*Primary Examiner* — Trong H Nguyen
(74) *Attorney, Agent, or Firm* — Slater Matsil, LLP (57) ABSTRACT

A multicast service processing method and an access point are disclosed. The method includes: generating, by an access point (AP), a first group addressed frame and an individually addressed frame based on a multicast packet, where the first group addressed frame is encrypted by a first multicast key, and the individually addressed frame is encrypted by a unicast key of a second terminal.

20 Claims, 6 Drawing Sheets

(51) Int. Cl.
    *H04L 12/18*              (2006.01)
    *H04L 61/5069*          (2022.01)
    *H04W 12/037*          (2021.01)
    *H04W 12/0433*        (2021.01)
    *H04L 101/622*        (2022.01)
    *H04W 84/12*           (2009.01)
    *H04W 88/08*           (2009.01)

(52) U.S. Cl.
    CPC ...... *H04W 12/037* (2021.01); *H04W 12/0433* (2021.01); *H04L 61/6022* (2013.01); *H04W 84/12* (2013.01); *H04W 88/08* (2013.01)

(58) Field of Classification Search
    CPC ...... H04W 4/06; H04W 12/04; H04L 12/189; H04L 61/2069; H04L 61/6022
    See application file for complete search history.

(56) References Cited

U.S. PATENT DOCUMENTS

| | | | | |
|---|---|---|---|---|
| 2007/0028099 A1* | 2/2007 | Entin | ................ | H04W 12/033 713/163 |
| 2008/0107272 A1* | 5/2008 | Carmeli | ............ | H04L 63/0428 380/278 |
| 2008/0313464 A1* | 12/2008 | Fascenda | .............. | H04L 9/0844 713/171 |
| 2011/0211517 A1* | 9/2011 | Moscibroda | .......... | H04L 1/0015 370/312 |
| 2013/0094367 A1* | 4/2013 | Zou | ........................ | H04W 4/06 370/241 |
| 2014/0192691 A1 | 7/2014 | Vyas et al. | | |
| 2014/0226818 A1* | 8/2014 | Wang | .................. | H04L 12/4641 380/270 |
| 2014/0233734 A1* | 8/2014 | Ram | ..................... | H04L 63/104 380/270 |
| 2014/0301378 A1 | 10/2014 | Xu | | |
| 2015/0249867 A1 | 9/2015 | Wang et al. | | |
| 2015/0249868 A1* | 9/2015 | Wang | ................... | H04L 9/0833 725/27 |
| 2015/0312091 A1* | 10/2015 | Yang | .................. | H04L 41/0663 370/221 |
| 2016/0192187 A1 | 6/2016 | Tao | | |

FOREIGN PATENT DOCUMENTS

| | | |
|---|---|---|
| CN | 102186261 A | 9/2011 |
| CN | 102882795 A | 1/2013 |
| CN | 103079231 A | 5/2013 |
| CN | 105812219 A | 7/2016 |

\* cited by examiner

MULTICAST SERVICE PROCESSING METHOD AND ACCESS POINT

CROSS-REFERENCE TO RELATED APPLICATIONS

This application is a continuation of International Application No. PCT/CN2018/078441, filed on Mar. 8, 2018, which claims priority to Chinese Patent Application No. 201710138249.2, filed on Mar. 9, 2017. The disclosures of the aforementioned applications are hereby incorporated by reference in their entireties.

TECHNICAL FIELD

This application relates to the field of wireless communications technologies, and in particular, to a multicast service processing method and an access point.

BACKGROUND

A wireless local area network (WLAN) may include a plurality of access points (APs).

When receiving a multicast packet, an AP may send the multicast packet in a multicast manner. When sending the multicast packet in the multicast manner, the AP may generate and send a corresponding multicast frame, so that a plurality of terminals in a multicast group receive a same multicast packet. However, there is no retransmission mechanism for the multicast frame, and reliability is not high.

Alternatively, the AP may send the multicast packet in a multicast-to-unicast manner. When sending the multicast packet in the multicast-to-unicast manner, the AP generates a plurality of corresponding unicast frames based on the multicast packet, and separately sends these unicast frames. Destination medium access control (MAC) addresses of these unicast frames are addresses of a plurality of terminals in a multicast group, respectively. Because the AP generates one unicast frame for each terminal, a usage rate of a central processing unit (CPU) of the AP that sends the multicast packet in the multicast-to-unicast manner is high. In addition, each unicast frame needs to use an air interface resource. Therefore, the AP that sends the multicast packet in the multicast-to-unicast manner occupies a lot of air interface resources.

SUMMARY

This application provides a multicast service processing method and an access point, to balance reliability and resource occupation of sending a multicast packet by an AP.

According to a first aspect, a multicast service processing method is provided, and the method includes: generating, by an access point (AP), a first group addressed frame and an individually addressed frame based on a multicast packet to be sent to terminals in a multicast group; and sending, by the AP, the first group addressed frame and the individually addressed frame; where the terminals in the multicast group include a first terminal and a second terminal; a type of the first terminal is a first type, a multicast key of a terminal of the first type is a first multicast key, a type of the second terminal is a second type, a multicast key of a terminal of the second type is a second multicast key, and the first multicast key and the second multicast key are different; a receiver address of the first group addressed frame is a group address of the multicast group, and the first group addressed frame is encrypted by using the first multicast key; and a receiver address of the individually addressed frame is an address of the second terminal, and the individually addressed frame is encrypted by using a unicast key of the second terminal.

In this way, the AP classifies the terminals in the multicast group into the first type and the second type, and multicast keys of terminals of different types are different. The types of the first terminal and the second terminal for receiving the multicast packet are the first type and the second type respectively, so that the first terminal and the second terminal have different multicast keys. The AP communicates with terminals of two types in a single multicast group in a multicast manner and a multicast-to-unicast manner respectively, thereby balancing reliability and resource occupation of sending the multicast packet by the AP. In addition, after receiving the first group addressed frame, the first terminal can decrypt the first group addressed frame and successfully receive the first group addressed frame. The second terminal cannot decrypt the first group addressed frame, but can successfully receive the individually addressed frame. Therefore, the second terminal will not receive repeated multicast packets.

With reference to the first aspect, in a first implementation of the first aspect, the method further includes: generating, by the AP, a second group addressed frame and a third group addressed frame based on a to-be-sent broadcast packet; and sending, by the AP, the second group addressed frame and the third group addressed frame; where a receiver address of the second group addressed frame is a broadcast address, and the second group addressed frame is encrypted by using the first multicast key; and a receiver address of the third group addressed frame is a broadcast address, and the third group addressed frame is encrypted by using the second multicast key.

The broadcast packet usually does not require high reliability and does not need to be sent in a multicast-to-unicast manner. Because the first terminal and the second terminal in the multicast group have different multicast keys, after receiving the second group addressed frame, the first terminal can use the first multicast key to decrypt the second group addressed frame, and cannot decrypt the third group addressed frame. The second terminal cannot decrypt the second group addressed frame, but can decrypt the third group addressed frame. Therefore, each terminal can receive a broadcast packet, and each terminal will not receive repeated broadcast packets.

With reference to the first aspect or the first implementation of the first aspect, in a second implementation of the first aspect, one or more terminals of the first type associated with the AP share the first multicast key; or terminals of the second type associated with the AP share the second multicast key.

With reference to the first aspect, the first implementation of the first aspect, or the second implementation of the first aspect, in a third implementation of the first aspect, the method further includes: when the AP converts the type of the second terminal from the second type to the first type, sending, by the AP, the first multicast key to the second terminal to instruct the second terminal to change the multicast key of the second terminal to the first multicast key; or when the AP converts the type of the first terminal from the first type to the second type, sending, by the AP, the second multicast key to the first terminal to instruct the first terminal to change the multicast key of the first terminal to the second multicast key.

With reference to the first aspect, the first implementation of the first aspect, the second implementation of the first aspect, or the third implementation of the first aspect, in a fourth implementation of the first aspect, after determining that a quantity of to-be-sent multicast packets buffered for the multicast group is greater than or equal to a first quantity threshold, the AP obtains an air interface rate of at least one terminal of the second type in the multicast group, where the at least one terminal includes the second terminal, and an air interface rate of the second terminal is less than a first rate threshold; and the AP converts the type of the second terminal from the second type to the first type.

According to a second aspect, an AP is provided, and the AP includes: a generation unit, configured to generate a first group addressed frame and an individually addressed frame based on a multicast packet to be sent to terminals in a multicast group; and a transceiver unit, configured to send the first group addressed frame and the individually addressed frame; where the terminals in the multicast group include a first terminal and a second terminal; a type of the first terminal is a first type, a multicast key of a terminal of the first type is a first multicast key, a type of the second terminal is a second type, a multicast key of a terminal of the second type is a second multicast key, and the first multicast key and the second multicast key are different; a receiver address of the first group addressed frame is a group address of the multicast group, and the first group addressed frame is encrypted by using the first multicast key; and a receiver address of the individually addressed frame is an address of the second terminal, and the individually addressed frame is encrypted by using a unicast key of the second terminal.

With reference to the second aspect, in a first implementation of the second aspect, the generation unit is further configured to generate a second group addressed frame and a third group addressed frame based on a to-be-sent broadcast packet; and the transceiver unit is further configured to send the second group addressed frame and the third group addressed frame; where a receiver address of the second group addressed frame is a broadcast address, and the second group addressed frame is encrypted by using the first multicast key; and a receiver address of the third group addressed frame is a broadcast address, and the third group addressed frame is encrypted by using the second multicast key.

With reference to the second aspect or the first implementation of the second aspect, in a second implementation of the second aspect, one or more terminals of the first type associated with the AP share the first multicast key; or terminals of the second type associated with the AP share the second multicast key.

According to a third aspect, an AP is provided, and the AP includes a transceiver and a processing circuit, where the processing circuit is configured to generate a first group addressed frame and an individually addressed frame based on a multicast packet to be sent to terminals in a multicast group; and the transceiver is configured to send the first group addressed frame and the individually addressed frame; where the terminals in the multicast group include a first terminal and a second terminal; a type of the first terminal is a first type, a multicast key of a terminal of the first type is a first multicast key, a type of the second terminal is a second type, a multicast key of a terminal of the second type is a second multicast key, and the first multicast key and the second multicast key are different; a receiver address of the first group addressed frame is a group address of the multicast group, and the first group addressed frame is encrypted by using the first multicast key; and a receiver address of the individually addressed frame is an address of the second terminal, and the individually addressed frame is encrypted by using a unicast key of the second terminal.

With reference to the third aspect, in a first implementation of the third aspect, the processing circuit is further configured to generate a second group addressed frame and a third group addressed frame based on a to-be-sent broadcast packet; and the transceiver is further configured to send the second group addressed frame and the third group addressed frame; where a receiver address of the second group addressed frame is a broadcast address, and the second group addressed frame is encrypted by using the first multicast key; and a receiver address of the third group addressed frame is a broadcast address, and the third group addressed frame is encrypted by using the second multicast key.

The AP may further include a memory, and the memory is configured to couple to the processing circuit and store a program instruction and data necessary for the access point.

With reference to the third aspect or the first implementation of the third aspect, in a second implementation of the third aspect, one or more terminals of the first type associated with the AP share the first multicast key; or terminals of the second type associated with the AP share the second multicast key.

According to a fourth aspect, a computer storage medium is provided, and is configured to store a computer software instruction used by the access point. The computer software instruction includes a program designed to execute the foregoing aspects.

DETAILED DESCRIPTION OF ILLUSTRATIVE EMBODIMENTS

The following describes this application in detail with reference to the accompanying drawings of the specification.

Figure 1:
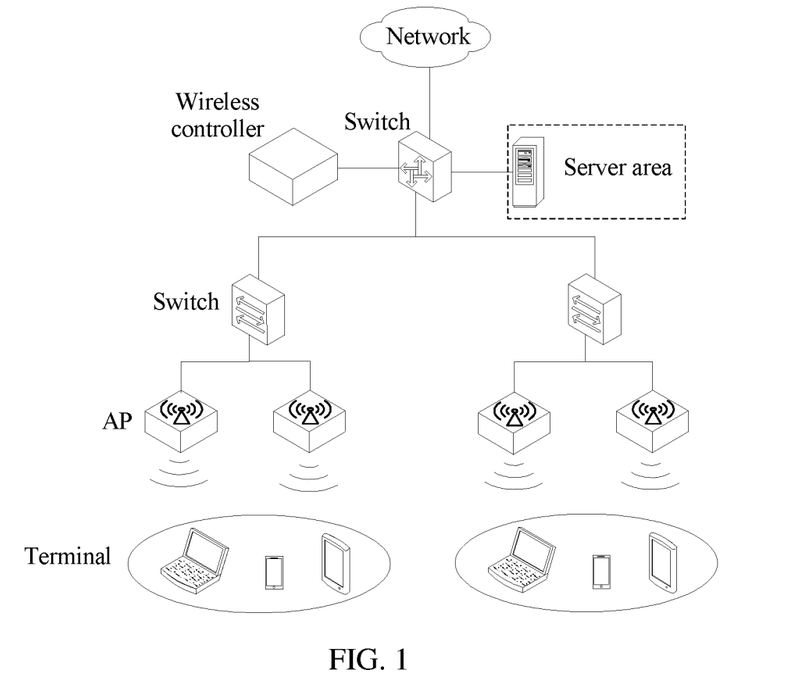
FIG. 1 is a schematic diagram of a WLAN network architecture to which this application is applicable.

FIG. 1 is a schematic diagram of a WLAN network architecture to which this application is applicable. As shown in FIG. 1, the network architecture includes APs and terminals. Optionally, the network architecture includes a wireless controller, a server, switches, or any combination thereof.

After receiving a multicast packet from a network, an AP may generate a wireless local area network frame based on the multicast packet and send the wireless local area network frame to a terminal. A multicast service processing method in this application is applicable to wireless local area network frame transmission between an AP and a terminal.

A method for balancing reliability and resource occupation of sending a multicast packet by an AP is that the AP sends multicast packets of different multicast groups in different manners. For example, when receiving a multicast packet of a multicast group A, the AP sends the multicast packet in a multicast manner, and when receiving a multicast packet of a multicast group B, the AP sends the multicast packet in a multicast-to-unicast manner. However, in this method, multicast packets can be processed and distinguished only at a multicast group granularity, which is not fine enough. In addition, this method cannot be implemented in some scenarios. For example, a teacher plays a same video program for all students in a class. Because all terminals are interested in a same multicast group, the AP cannot provide some of the terminals with a multicast packet sending manner that is different from that of some other terminals.

In an 802.11-2012 standard of the Institute of Electrical and Electronics Engineers (IEEE), a direct multicast service (DMS) is provided for a terminal requesting a DMS to transmit a group addressed frame as individually addressed frames. If the AP accepts a DMS request from the terminal, the AP sends a group addressed MAC service data unit (MSDU) as an A-MSDU subframe of an individually addressed aggregate MSDU (A-MSDU) to the terminal. Correspondingly, the terminal stores a list of all group addresses after a DMS is requested by the terminal and accepted by the AP. The terminal discards a group addressed frame that matches a group address in the list. Only after the terminal requests the DMS, the AP can enable the DMS. Otherwise, the terminal receives not only a group addressed frame but also an A-MSDU subframe of an individually addressed A-MSDU, and payloads of the frame and the subframe are the same. The payload of the frame or the subframe is a higher layer protocol part of a same multicast packet. Therefore, the terminal receives repeated multicast packets. The repeated multicast packets may cause a processing error of the terminal. For example, repeated video multicast packets may cause a pixelated or frozen display of a played video. Therefore, only after the terminal supports and requests the DMS, the AP can use the DMS to provide different multicast packet sending manners for different terminals in a same multicast group. In addition, the AP cannot independently select terminals for which the DMS is to be provided, and cannot coordinate different multicast packet sending manners to implement optimized balance of reliability and resource occupation. For example, in the same scenario in which a teacher plays a same video program for all students in a class, intensity of a signal received by a distant terminal is low. An optimized solution of the balance of reliability and resource occupation is that the AP sends the multicast packet to the distant terminal in the multicast-to-unicast manner to enhance reliability, and sends the multicast packet to a nearby terminal in the multicast manner to reduce resource occupation. However, terminals cannot cooperate to determine which terminals should request the DMS. As a result, balance of reliability and resource occupation cannot be implemented by using the DMS.

Based on this, this application provides a multicast service processing method, used to balance reliability and resource occupation of sending the multicast packet by the AP.

Specifically, the wireless local area network frame sent to the terminal by the AP may be a group addressed frame or an individually addressed frame. A receiver address of the group addressed frame is a group address of a multicast group or a broadcast address. A receiver address of the individually addressed frame is a unicast address.

To ensure security of packet transmission, the wireless local area network frame sent by the AP may be encrypted. When being associated with the AP, the terminal negotiates with the AP about a pairwise transient key (PTK) for encrypting the individually addressed frame and a group temporal key (GTK) for encrypting the group addressed frame. After negotiation, the PTK and the GTK are installed in the terminal. For example, the AP uses the GTK to encrypt and send the group addressed frame, and a receiver address of the group addressed frame is a group address of the multicast group A. After receiving the group addressed frame, a terminal interested in the multicast group A may use the GTK to decrypt the group addressed frame, and successfully receive the group addressed frame. After the AP uses the PTK to encrypt and send the individually addressed frame, because a receiver address of the individually addressed frame is a unicast address, a terminal that receives the individually addressed frame may use the PTK to decrypt the individually addressed frame, and successfully receive the individually addressed frame.

It is assumed that when the terminal is being associated with the AP, a GTK negotiated by the terminal and the AP is a default GTK. Based on this, a new GTK is introduced in this application. The new GTK may be generated by the AP in a same manner of generating the default GTK, that is, the new GTK may be generated by using a pseudo random function (PRF) based on a group master key (GMK), a character string "Group key expansion", a MAC address of the AP, and a group nonce (GNonce). In this application, reliability and resource occupation of sending the multicast packet by the AP is balanced by introducing the new GTK.

The terminal in this application is a terminal that has a wireless local area network (WLAN) function. For example, the terminal may be a mobile phone, a computer, a tablet computer, a mobile Internet device (MID), a wearable device, an in-vehicle mobile device, or an e-book reader.

Figure 2:
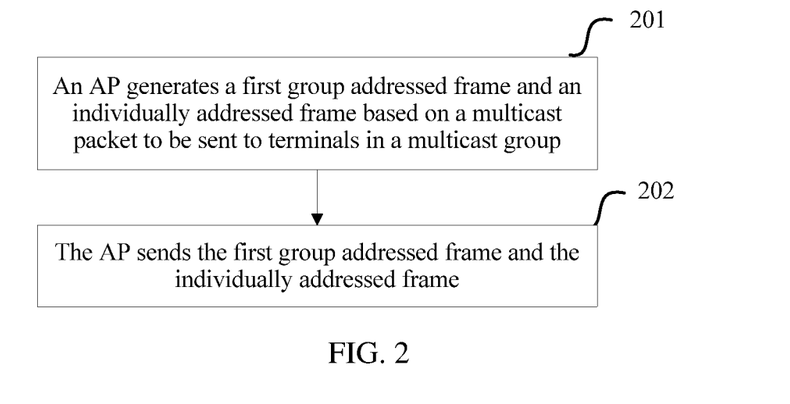
FIG. 2 is a schematic flowchart corresponding to a packet transmission method according to this application.

Based on the foregoing network architecture, FIG. 2 is a schematic flowchart corresponding to a multicast service processing method according to this application. As shown in FIG. 2, the method includes the following steps.

Step 201: An AP generates a first group addressed frame and an individually addressed frame based on a multicast packet to be sent to terminals in a multicast group.

Step 202: The AP sends the first group addressed frame and the individually addressed frame.

The terminals in the multicast group include a first terminal and a second terminal. A type of the first terminal is a first type, a multicast key of a terminal of the first type is a first multicast key, a type of the second terminal is a second type, a multicast key of a terminal of the second type is a second multicast key, and the first multicast key and the second multicast key are different. A payload of the first group addressed frame is the same as that of the multicast packet, and a payload of the individually addressed frame is the same as that of the multicast packet. A receiver address of the first group addressed frame is a group address of the multicast group, and the first group addressed frame is encrypted by using the first multicast key. A receiver address of the individually addressed frame is an address of the second terminal, and the individually addressed frame is encrypted by using a unicast key of the second terminal.

In this application, the AP classifies the terminals in the multicast group into the first type and the second type, and multicast keys of terminals of different types are different. The types of the first terminal and the second terminal for receiving the multicast packet are the first type and the second type respectively, so that the first terminal and the second terminal have different multicast keys. The AP communicates with terminals of two types in a single multicast group in a multicast manner and a multicast-to-unicast manner respectively, thereby balancing reliability and resource occupation of sending the multicast packet by the AP. In addition, after receiving the first group addressed frame, the first terminal can decrypt the first group addressed frame and successfully receive the first group addressed frame. The second terminal cannot decrypt the first group addressed frame, but can successfully receive the individually addressed frame. Therefore, the second terminal will not receive repeated multicast packets.

A destination MAC address of the multicast packet is a multicast address. The payload of the multicast packet includes an Internet Protocol (IP) header, and a destination IP address of the IP header is a multicast address. In this application, the payload of the individually addressed frame is the same as that of the multicast packet, and a destination IP address in the payload of the individually addressed frame is the multicast address. Therefore, a receiver address in a frame header of the individually addressed frame is a unicast address, but the destination IP address of the individually addressed frame is the multicast address.

In a possible implementation, the first multicast key is a new GTK, and correspondingly, the second multicast key is a default GTK. In this case, the first multicast key may be generated and sent to the terminal by the AP. After receiving the first multicast key, the terminal changes the multicast key from the default GTK to the new GTK. In this case, the type of the terminal is switched from the second type to the first type. Correspondingly, the AP stores an address list of terminals to which the first multicast key is sent, and a receiver address of an individually addressed frame subsequently sent by the AP does not include an address of a terminal in the address list.

A multicast group A is used as an example. The AP generates a first group addressed frame and an individually addressed frame based on a multicast packet to be sent to terminals in the multicast group A, and sends the first group addressed frame and the individually addressed frame.

A receiver address of the first group addressed frame is an address of the multicast group A, and the first group addressed frame is encrypted by using the new GTK; and a receiver address of the individually addressed frame is a unicast address, and the individually addressed frame is encrypted by using a PTK.

After the first terminal interested in the multicast group A receives the first group addressed frame, because the multicast key of the first terminal is a new GTK, the first terminal uses the new GTK to decrypt the first group addressed frame, and successfully receives the first group addressed frame. However, the receiver address of the individually addressed frame does not include an address of the first terminal. Therefore, the first terminal will not receive the individually addressed frame. The payload of the first group addressed frame is the same as that of the individually addressed frame, and the first terminal can successfully receive the first group addressed frame but does not receive the individually addressed frame, thereby effectively avoiding a problem of repeated receiving.

After the second terminal interested in the multicast group A receives the first group addressed frame, because the multicast key of the second terminal is a default GTK, the second terminal uses the default GTK to decrypt the first group addressed frame, but decryption fails, and the second terminal cannot successfully receive the first group addressed frame. However, the receiver address of the individually addressed frame includes an address of the second terminal. Therefore, the second terminal can receive the individually addressed frame, decrypt the individually addressed frame by using a PTK, and successfully receive the individually addressed frame. The payload of the first group addressed frame is the same as that of the individually addressed frame, the second terminal can successfully receive the individually addressed frame, but cannot successfully receive the first group addressed frame, thereby effectively avoiding the problem of repeated receiving.

In this application, the individually addressed frame may be an individually addressed MSDU. The AP may set a receiver address of the individually addressed MSDU as the address of the second terminal, and separately send the individually addressed MSDU to each second terminal. The individually addressed MSDU may be encrypted by using the PTK. After receiving the individually addressed MSDU, the second terminal decrypts the individually addressed MSDU by using the PTK to obtain a multicast packet. For example, the AP uses an address of a second terminal A as a receiver address of an individually addressed frame A, and uses an address of a second terminal B as a receiver address of an individually addressed frame B. The AP sends the individually addressed frame A to the second terminal A, and sends the individually addressed frame B to the second terminal B.

Alternatively, the individually addressed frame may be an individually addressed A-MSDU. The AP may send the multicast packet to the second terminal as an A-MSDU subframe in the individually addressed A-MSDU. The AP may alternatively change a destination MAC address of the multicast packet to the address of the second terminal, and send a changed multicast packet to the second terminal as an A-MSDU subframe in the individually addressed A-MSDU. The individually addressed A-MSDU may be encrypted by using the PTK. A receiver address of the individually addressed A-MSDU is the address of the second terminal. After receiving the individually addressed A-MSDU, the second terminal decrypts the individually addressed A-MSDU by using the PTK to obtain the multicast packet.

The foregoing content describes a manner of processing, by the AP, the multicast packet to be sent to the multicast group A in detail. In this application, for a to-be-sent broadcast packet, the AP may generate a second group addressed frame and a third group addressed frame based on the to-be-sent broadcast packet, and send the second group addressed frame and the third group addressed frame. A payload of the second group addressed frame is the same as that of the broadcast packet, and a payload of the third group addressed frame is the same as that of the broadcast packet. A receiver address of the second group addressed frame is a broadcast address, and the second group addressed frame is encrypted by using the first multicast key; and a receiver address of the third group addressed frame is a broadcast address, and the third group addressed frame is encrypted by using the second multicast key.

In this way, after receiving the second group addressed frame, a terminal of the first type interested in the multicast group A uses a new GTK to decrypt the second group addressed frame, and successfully receives the second group addressed frame; and after receiving the third group addressed frame, the terminal of the first type interested in the multicast group A uses the new GTK to decrypt the third group addressed frame, but decryption fails, and the terminal of the first type interested in the multicast group A cannot successfully receive the third group addressed frame. Because the payload of the second group addressed frame is the same as that of the third group addressed frame, the terminal of the first type can successfully receive the second group addressed frame, but cannot successfully receive the third group addressed frame, thereby effectively avoiding the problem of repeated receiving.

After receiving the third group addressed frame, a terminal of the second type interested in the multicast group A uses a default GTK to decrypt the second group addressed frame, but decryption fails, and the terminal of the second type interested in the multicast group A cannot successfully receive the second group addressed frame; and after receiving the third group addressed frame, the terminal of the second type interested in the multicast group A uses the default GTK to decrypt the third group addressed frame, and successfully receives the third group addressed frame. Because the payload of the second group addressed frame is the same as that of the third group addressed frame, the terminal of the second type can successfully receive the third group addressed frame, but cannot successfully receive the second group addressed frame, thereby effectively avoiding the problem of repeated receiving.

In the foregoing manner, both the terminal of the first type and the terminal of the second type that are interested in the multicast group A can successfully receive a broadcast packet, and the problem of repeated receiving does not exist.

In another possible implementation, the first multicast key is a default GTK, and correspondingly, the second multicast key is a new GTK. In this case, the second multicast key may be generated and sent to the terminal by the AP. After receiving the second multicast key, the terminal changes the multicast key from the default GTK to the new GTK. In this case, the type of the terminal is switched from the first type to the second type. Correspondingly, the AP stores an address list of terminals to which the second multicast key is sent by the AP, and a receiver address of an individually addressed frame subsequently sent by the AP includes an address of a terminal in the address list. For a specific implementation process, refer to the foregoing implementation, and details are not described herein again.

The AP may classify terminals associated with the AP into two types. The AP may send multicast packets of different multicast groups to terminals of various types in different manners. For example, the AP may classify the terminals associated with the AP into a type 1 and a type 2. For a multicast group 1, the AP sends a multicast packet of the multicast group 1 to a terminal of the type 1 in a multicast manner, and sends the multicast packet of the multicast group 1 to a terminal of the type 2 in a multicast-to-unicast manner. For a multicast group 2, the AP sends a multicast packet of the multicast group 2 to the terminal of the type 1 in the multicast-to-unicast manner, and sends the multicast packet of the multicast group 2 to the terminal of the type 2 in the multicast manner. For a multicast group 3, the AP sends a multicast packet of the multicast group 3 to the terminal of the type 1 in the multicast-to-unicast manner, and sends the multicast packet of the multicast group 3 to the terminal of the type 2 in the multicast-to-unicast manner. For a multicast group 4, the AP sends a multicast packet of the multicast group 4 to the terminal of the type 1 in the multicast manner, and sends the multicast packet of the multicast group 4 to the terminal of the type 2 in the multicast manner. Similarly, the AP may classify the terminals associated with the AP into more than two types, and may send multicast packets of different multicast groups to terminals of various types in different manners. Two of the more than two types are the first type and the second type respectively.

For example, the second multicast key is a default GTK and the first multicast key is a new GTK. The following specifically describes a process of switching the types of the terminals in the multicast group A between the first type and the second type.

In an initial time period (it is assumed that the initial time period starts from a moment 0), all newly-added terminals in the multicast group A transmit a wireless local area network frame in a unicast manner. In this case, the types of the terminals in the multicast group A are all of the second type, and multicast keys of the terminals are default GTKs.

The AP detects, in real time, a quantity of to-be-sent multicast packets buffered by the multicast group A. If at a moment t, the AP determines that the quantity of to-be-sent multicast packets buffered by the multicast group A is greater than or equal to a first quantity threshold, an air interface rate of each terminal in the multicast group A at this time may be obtained, and the first multicast key (namely, the new GTK) is sent to a second terminal whose air interface rate is less than a first rate threshold. After receiving the first multicast key, the second terminal whose air interface rate is less than the first rate threshold updates the multicast key from the default GTK to the first multicast key (namely, the new GTK). In this case, a type of the second terminal whose air interface rate is less than the first rate threshold is switched from the second type to the first type. Both the first quantity threshold and the first rate threshold may be set by a person skilled in the art based on an actual situation and experience. Specifically, the first quantity threshold may be determined based on a maximum quantity of to-be-sent multicast packets that can be buffered by the multicast group A. For example, the first quantity threshold may be set as 80% of the maximum quantity of to-be-sent multicast packets that can be buffered by the multicast group A.

If at a moment t+k1, the AP determines that the quantity of to-be-sent multicast packets buffered by the multicast group A is less than a second quantity threshold, an air interface rate of each first terminal in the multicast group A at this moment may be obtained, and the second multicast key (namely, the default GTK) is sent to a first terminal whose air interface rate is greater than or equal to a second rate threshold. After receiving the default GTK, the first terminal whose air interface rate is greater than or equal to the second rate threshold updates the multicast key from the first multicast key (namely, the new GTK) to the default GTK. In this case, a type of the first terminal whose air interface rate is greater than or equal to the second rate threshold is switched from the first type to the second type. Both the second quantity threshold and the second rate threshold may also be set by a person skilled in the art based on an actual situation and experience, and the second quantity threshold is less than the first quantity threshold. For example, the second quantity threshold may be set as 50% of the maximum quantity of to-be-sent multicast packets that can be buffered by the multicast group A.

If at a moment t+k1+k2, the AP determines that the quantity of packets buffered by the multicast group A is greater than or equal to the first quantity threshold, an air interface rate of each second terminal in the multicast group A at this time may be obtained, and the first multicast key is sent to a second terminal whose air interface rate is less than the first rate threshold. After receiving the first multicast key, the second terminal whose air interface rate is less than the rate threshold updates the multicast key from the GTK to the first multicast key. In this case, a type of the second terminal whose air interface rate is less than the rate threshold is switched from the second type to the first type.

At a subsequent moment, the AP may determine, based on a relationship between the quantity of to-be-sent multicast packets buffered by the multicast group A and the first quantity threshold or the second quantity threshold, whether to switch the type of the terminal in the multicast group between the first type and the second type.

The "less than" in the foregoing descriptions may also refer to "less than or equal to".

Optionally, in this application, when the AP switches the type of the terminal between the first type and the second type based on the air interface rate of the terminal in the multicast group A, a quantity of terminals for switching may be set. For example, after determining that the quantity of packets buffered by the multicast group A is greater than or equal to the first quantity threshold, the AP may obtain air interface rates of terminals in the multicast group A, sort the terminals based on the air interface rates, and send the first multicast key to W terminals with relatively low air interface rates. A value of W may be set based on an actual situation. In this case, a switching granularity may be controlled by setting the value of W. If the value of W is 1, switching is implemented between two multicast manners by using a single terminal as a granularity in the multicast group A.

Figure 3:
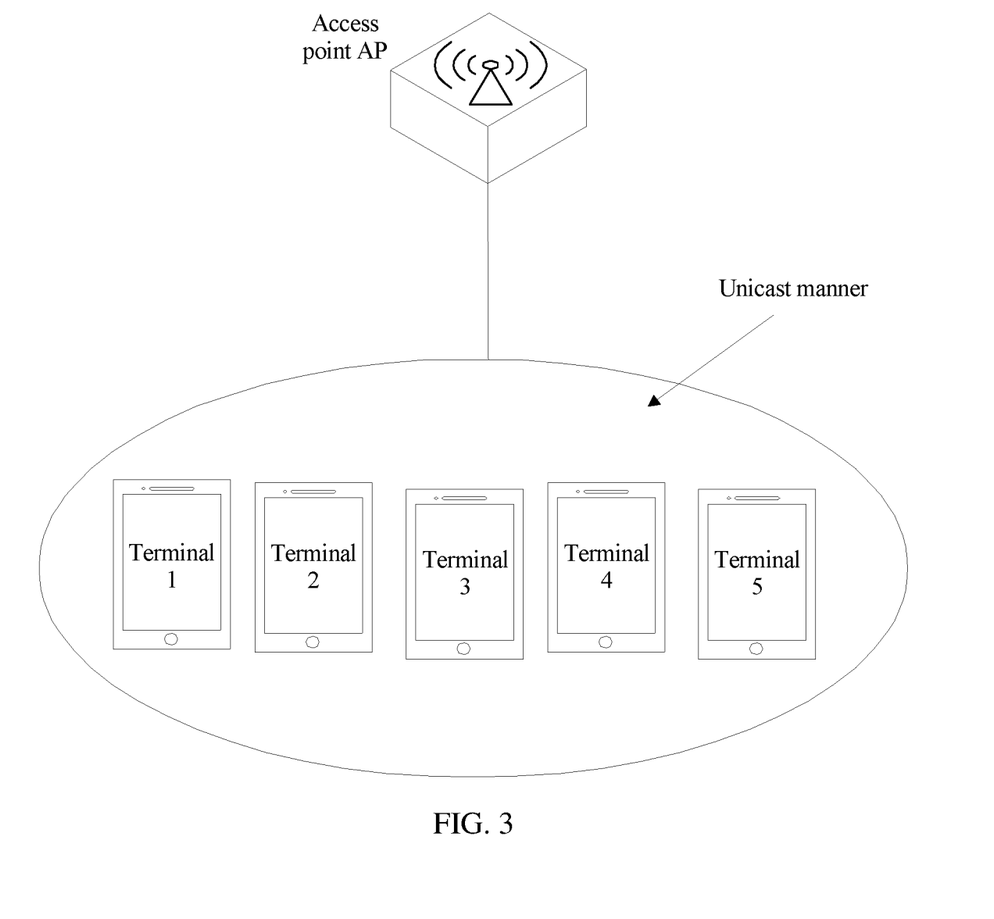
FIG. 3 is a schematic diagram of a packet transmission manner between an AP and a terminal within a time period of (0, t] according to this application.

For example, it is assumed that, in a time period (0, t], five terminals join the multicast group A. As shown in FIG. 3, a terminal 1, a terminal 2, a terminal 3, a terminal 4, and a terminal 5 join the multicast group A. In this case, types of the terminal 1, the terminal 2, the terminal 3, the terminal 4, and the terminal 5 are all of the second type, and the AP may send an individually addressed frame to the terminal 1, the terminal 2, the terminal 3, the terminal 4, and the terminal 5 in a unicast manner.

Figure 4:
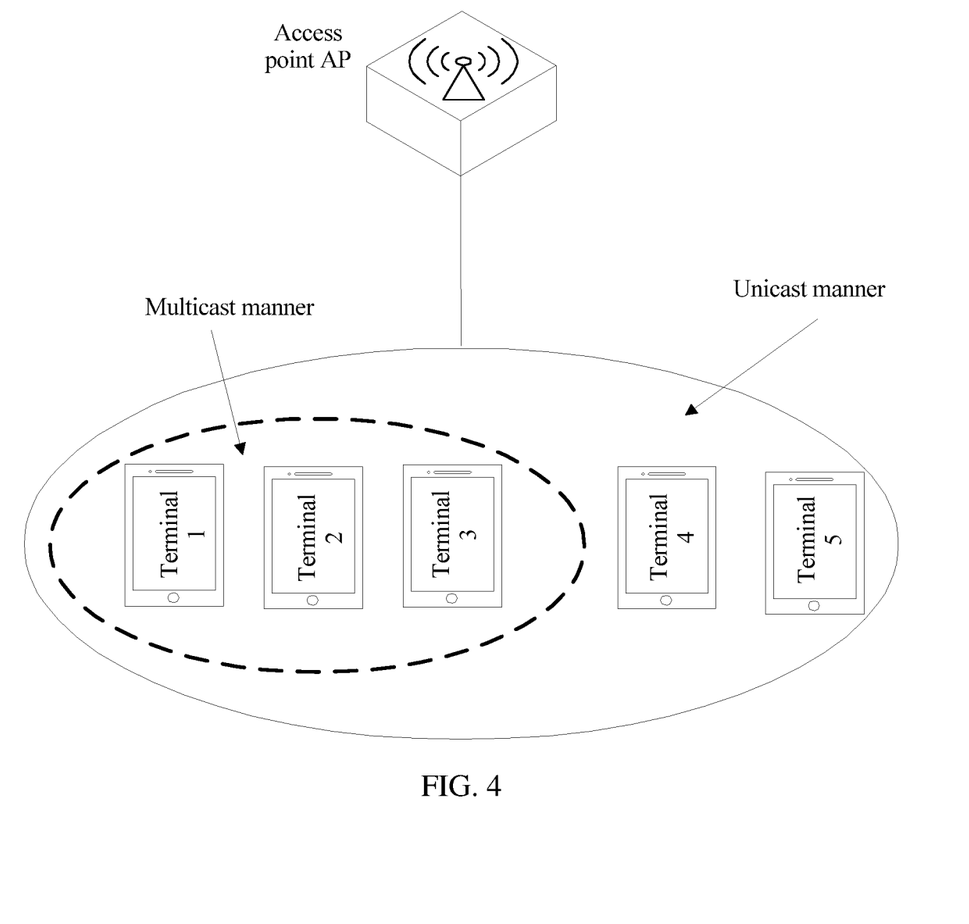
FIG. 4 is a schematic diagram of a packet transmission manner between an AP and a terminal within a time period of (t, t+k1] according to this application.

Then, at the moment t, after determining that the quantity of to-be-sent multicast packets buffered by the multicast group A is greater than or equal to the first quantity threshold, the AP sends the first multicast key to the terminal 1, the terminal 2, and the terminal 3 (air interface rates of the terminal 1, the terminal 2, and the terminal 3 are less than the first rate threshold), and the types of the terminal 1, the terminal 2, and the terminal 3 are switched from the second type to the first type. In this case, as shown in FIG. 4, the AP may send a group addressed frame to the terminal 1, the terminal 2, and the terminal 3 in a multicast manner, and send an individually addressed frame to the terminal 4 and the terminal 5 in a unicast manner.

Figure 5:
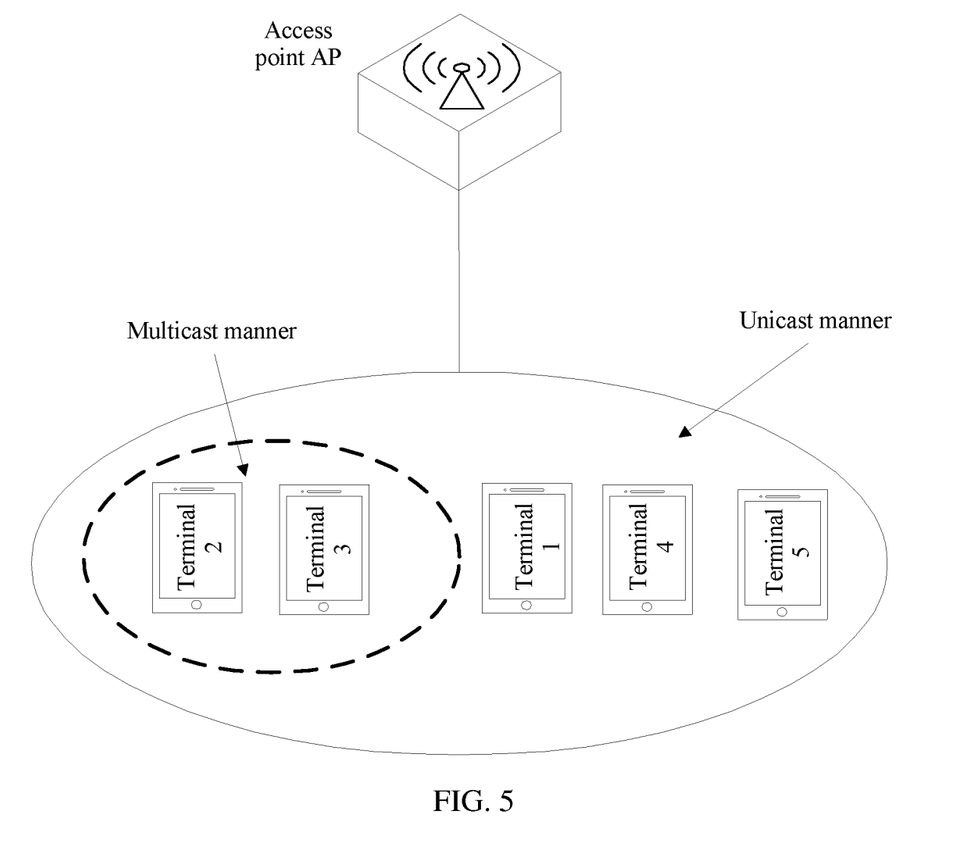
FIG. 5 is a schematic diagram of a packet transmission manner between an AP and a terminal within a time period of (t+k1, t+k1+k2] according to this application.

Then, at the moment t+k1, after determining that the quantity of to-be-sent multicast packets buffered by the multicast group A is less than the second quantity threshold, the AP sends the second multicast key to the terminal 1 (an air interface rate of the terminal 1 is greater than or equal to the second rate threshold), and the type of the terminal 1 is switched from the first type to the second type. In this case, as shown in FIG. 5, the AP may send a group addressed frame to the terminal 2 and the terminal 3 in a multicast manner, and send an individually addressed frame to the terminal 1, the terminal 4, and the terminal 5 in a unicast manner.

Figure 6:
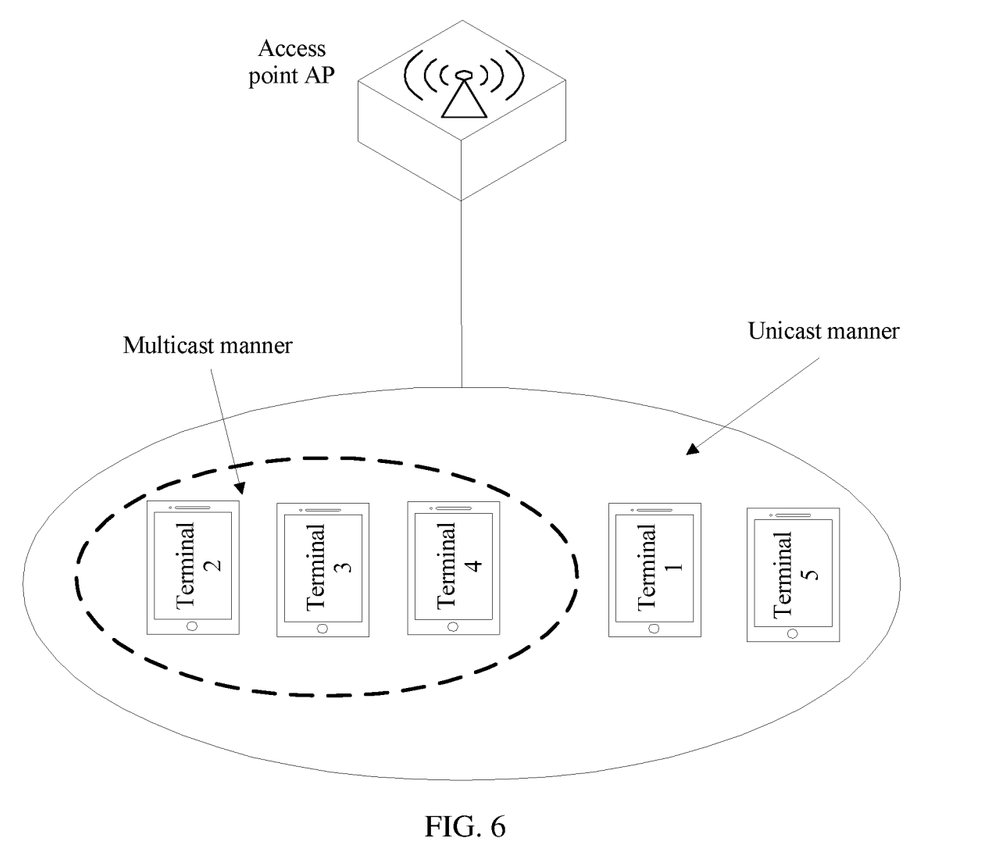
FIG. 6 is a schematic diagram of a packet transmission manner between an AP and a terminal after a moment t+k1+k2 according to this application.

Then, at the moment t+k1+k2, after determining that the quantity of to-be-sent multicast packets buffered by the multicast group A is greater than or equal to the first quantity threshold, the AP may send the first multicast key to the terminal 4 (an air interface rate of the terminal 4 is less than the first rate threshold), and the type of the terminal 4 is switched from the second type to the first type. In this case, as shown in FIG. 6, the AP may send a group addressed frame to the terminal 2, the terminal 3, and the terminal 4 in a multicast manner, and send an individually addressed frame to the terminal 1 and the terminal 5 in a unicast manner.

In the foregoing example, only the terminal that joins the multicast group A in the initial time period is used as an example for description. In an actual case, a terminal may join the multicast group A at any moment. If a terminal a joins the multicast group A in the time period (0, t], the terminal a may transmit a packet in a unicast manner, and in this case, a type of the terminal a is the second type. If the terminal a joins the multicast group A in a time period (t, t+k1], the AP may send the first multicast key to the terminal a, the terminal a updates the multicast key from the GTK to the first multicast key, and in this case, the type of the terminal a is the first type. If the terminal a joins the multicast group A in a time period (t+k1, t+k1+k2], the terminal a may transmit a packet in a unicast manner, and in this case, the type of the terminal a is the second type. Subsequently, a type of a terminal newly joining the multicast group A may be determined as the first type or the second type based on the foregoing content.

In this application, to further ensure accuracy and reasonableness of switching, a type of a terminal in the multicast group A can be switched from the second type to the first type only after the AP determines that the quantity of to-be-sent multicast packets buffered by the multicast group A is greater than or equal to the first quantity threshold and duration exceeds a first time threshold; and a type of a qualified terminal in the multicast group A can be switched from the first type to the second type only after the AP determines that the quantity of to-be-sent multicast packets buffered by the multicast group A is less than the second quantity threshold and duration exceeds a second time threshold. The first time threshold and the second time threshold may be set by a person skilled in the art based on an actual situation and experience, and the first time threshold may be equal to the second time threshold. For example, both the first time threshold and the second time threshold are 1os, or the first time threshold may be unequal to the second time threshold, which is not specifically limited.

According to the foregoing method, two multicast manners may be switched between each other at a terminal granularity in a multicast group, so that packet transmission manners can be switched more smoothly, and utilization of AP and air interface resources can be maximized to effectively improve user experience. In addition, in this application, an air interface change is determined based on a quantity of packets buffered by each multicast group and an air interface rate of a terminal, so that switching of the packet transmission manners can be controlled more accurately and resources can be allocated more properly.

For the foregoing method process, this application further provides an AP. For specific content of the AP, refer to the foregoing method embodiment.

Figure 7:
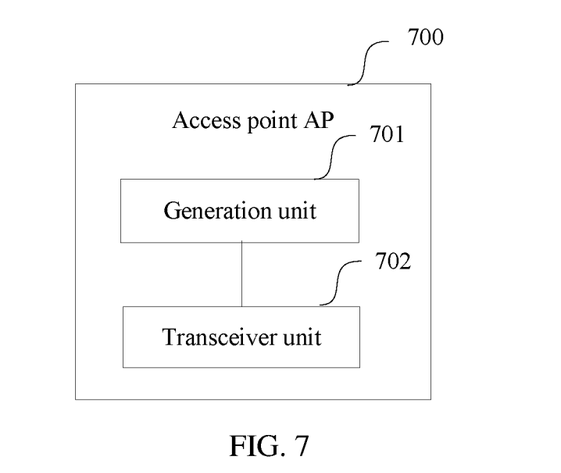
FIG. 7 is a schematic structural diagram of an AP according to this application.

FIG. 7 is a schematic structural diagram of an AP according to this application. As shown in FIG. 7, the AP 700 includes a generation unit 701 and a transceiver unit 702.

The generation unit 701 is configured to generate a first group addressed frame and an individually addressed frame based on a multicast packet to be sent to terminals in a multicast group.

The transceiver unit 702 is configured to send the first group addressed frame and the individually addressed frame.

The terminals in the multicast group include a first terminal and a second terminal.

A type of the first terminal is a first type, a multicast key of a terminal of the first type is a first multicast key, a type of the second terminal is a second type, a multicast key of a terminal of the second type is a second multicast key, and the first multicast key and the second multicast key are different.

A receiver address of the first group addressed frame is a group address of the multicast group, and the first group addressed frame is encrypted by using the first multicast key.

A receiver address of the individually addressed frame is an address of the second terminal, and the individually addressed frame is encrypted by using a unicast key of the second terminal.

Optionally, the generation unit 701 is further configured to generate a second group addressed frame and a third group addressed frame based on a to-be-sent broadcast packet.

The transceiver unit 702 is further configured to send the second group addressed frame and the third group addressed frame.

A receiver address of the second group addressed frame is a broadcast address, and the second group addressed frame is encrypted by using the first multicast key.

A receiver address of the third group addressed frame is a broadcast address, and the third group addressed frame is encrypted by using the second multicast key.

Optionally, one or more terminals of the first type associated with the AP share the first multicast key; or terminals of the second type associated with the AP share the second multicast key.

Figure 8:
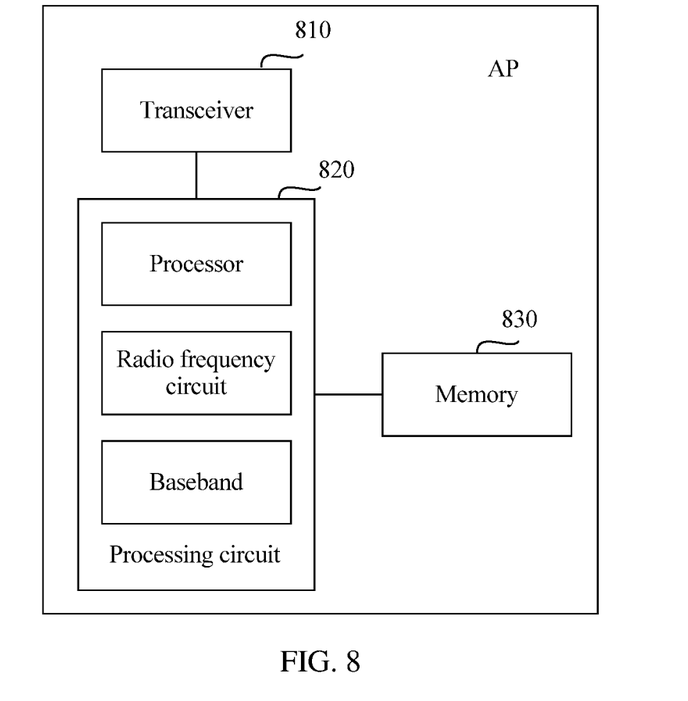
FIG. 8 is a schematic structural diagram of another AP according to this application.

FIG. 8 is a schematic structural diagram of another AP according to this application. The AP includes at least a transceiver 81o (such as an antenna) and a processing circuit 820, and may further include a memory 830. For example, the processing circuit 820 includes a processor, a radio frequency circuit, and a baseband. The processor, the radio frequency circuit, and the baseband may be independent chips or may be integrated into one chip.

The processing circuit 820 may be a CPU, or a combination of the CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 830 may include a volatile memory, for example, a random-access memory (RAM). The memory 830 may alternatively include a non-volatile memory, for example, a read-only memory (ROM), a flash memory, a hard disk drive (HDD), or a solid-state drive (SSD). The memory 830 may alternatively include a combination of the foregoing types of memories. The memory 830 stores program code, and transmits the stored program code to the processing circuit.

The processing circuit 820 is configured to generate a first group addressed frame and an individually addressed frame based on a multicast packet to be sent to terminals in a multicast group.

The transceiver 810 is configured to send the first group addressed frame and the individually addressed frame.

The terminals in the multicast group include a first terminal and a second terminal.

A type of the first terminal is a first type, a multicast key of a terminal of the first type is a first multicast key, a type of the second terminal is a second type, a multicast key of a terminal of the second type is a second multicast key, and the first multicast key and the second multicast key are different.

A receiver address of the first group addressed frame is a group address of the multicast group, and the first group addressed frame is encrypted by using the first multicast key.

A receiver address of the individually addressed frame is an address of the second terminal, and the individually addressed frame is encrypted by using a unicast key of the second terminal.

Optionally, the processing circuit 820 is further configured to generate a second group addressed frame and a third group addressed frame based on a to-be-sent broadcast packet.

The transceiver 810 is further configured to send the second group addressed frame and the third group addressed frame.

A receiver address of the second group addressed frame is a broadcast address, and the second group addressed frame is encrypted by using the first multicast key.

A receiver address of the third group addressed frame is a broadcast address, and the third group addressed frame is encrypted by using the second multicast key.

Optionally, one or more terminals of the first type associated with the AP share the first multicast key; or terminals of the second type associated with the AP share the second multicast key.

It can be learned from the foregoing content that, in this application, the AP classifies the terminals in the multicast group into the first type and the second type, and multicast keys of terminals of different types are different. The types of the first terminal and the second terminal for receiving the multicast packet are the first type and the second type respectively, so that the first terminal and the second terminal have different multicast keys. The AP communicates with terminals of two types in a single multicast group in a multicast manner and a multicast-to-unicast manner respectively, thereby balancing reliability and resource occupation of sending the multicast packet by the AP. In addition, after receiving the first group addressed frame, the first terminal can decrypt the first group addressed frame and successfully receive the first group addressed frame. The second terminal cannot decrypt the first group addressed frame, but can successfully receive the individually addressed frame. Therefore, the second terminal will not receive repeated multicast packets.

All or some of the foregoing embodiments may be implemented through software, hardware, or any combination thereof. When software is used to implement the embodiments, the embodiments may be implemented completely or partially in a form of a computer program product. The computer program product includes one or more computer instructions. When the computer program instructions are loaded and executed on a computer, the procedures or the functions according to the embodiments of the present invention are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, a twisted pair, or an optical fiber) or wireless (for example, infrared, radio, or microwave) manner. The computer-readable storage medium may be any medium storable by a computer, or a data storage device, such as a server or a data center, integrating one or more media. The medium may be a magnetic medium (such as a floppy disk, a hard disk, or a magnetic tape), an optical medium (such as an optical disc), a semiconductor medium (such as a solid-state drive), or the like.

Apparently, a person skilled in the art may make various modifications and variations to this application without departing from the scope of this application. In this way, this application is intended to cover these modifications and variations provided that they fall within the scope of protection defined by the following claims.

What is claimed is:

1. A method, comprising:
generating, by an access point (AP), a first group-addressed frame and an individually-addressed frame based on a multicast packet to be sent to terminals in a multicast group; and
sending, by the AP, the first group-addressed frame and the individually-addressed frame;
wherein:
the terminals in the multicast group comprise a first terminal and a second terminal;
a type of the first terminal is a first type, a multicast key of any terminal of the first type that associates with the AP is a first multicast key, a type of the second terminal is a second type, a multicast key of any terminal of the second type that associates with the AP is a second multicast key, and the first multicast key and the second multicast key are different;
a receiver address of the first group-addressed frame is a group address of the multicast group, and the first group-addressed frame is encrypted using the first multicast key;
a receiver address of the individually-addressed frame is an address of the second terminal, wherein the individually-addressed frame is encrypted using a unicast key of the second terminal, and wherein the individually-addressed frame is based on the same multicast packet as the first group-addressed frame; and
for each terminal of the multicast group, only one of the first multicast key or the second multicast key is sent to the respective terminal, wherein the first terminal receives the first multicast key, wherein the second terminal receives the second multicast key and the unicast key, and wherein the second terminal is able to decrypt the individually-addressed frame to receive the multicast packet using the unicast key but is unable to decrypt the first group-addressed frame to receive the multicast packet using the second multicast key.

2. The method according to claim 1, further comprising:
generating, by the AP, a second group-addressed frame and a third group-addressed frame based on a to-be-sent broadcast packet; and
sending, by the AP, the second group-addressed frame and the third group-addressed frame;
wherein:
a receiver address of the second group-addressed frame is a first broadcast address, and the second group-addressed frame is encrypted using the first multicast key; and
a receiver address of the third group-addressed frame is a second broadcast address, and the third group-addressed frame is encrypted using the second multicast key.

3. The method according to claim 2, wherein:
a plurality of terminals of the first type associated with the AP share the first multicast key; or
a plurality of terminals of the second type associated with the AP share the second multicast key.

4. The method according to claim 2, wherein a plurality of terminals of the first type associated with the AP share the first multicast key.

5. The method according to claim 2, wherein a plurality of terminals of the second type associated with the AP share the second multicast key.

6. The method according to claim 1, wherein:
a plurality of terminals of the first type associated with the AP share the first multicast key; or
a plurality of terminals of the second type associated with the AP share the second multicast key.

7. The method according to claim 1, wherein a plurality of terminals of the first type associated with the AP share the first multicast key.

8. The method according to claim 1, wherein a plurality of terminals of the second type associated with the AP share the second multicast key.

9. An access point (AP), comprising:
a transceiver; and
a processing circuit;
wherein:
the processing circuit is configured to generate a first group-addressed frame and an individually-addressed frame based on a multicast packet to be sent to terminals in a multicast group;
the transceiver is configured to send the first group-addressed frame and the individually-addressed frame;
the terminals in the multicast group comprise a first terminal and a second terminal;
a type of the first terminal is a first type, a multicast key of any terminal of the first type that associate with the AP is a first multicast key, a type of the second terminal is a second type, a multicast key of any terminal of the second type that associates with the AP is a second multicast key, and the first multicast key and the second multicast key are different;
a receiver address of the first group-addressed frame is a group address of the multicast group, and the first group-addressed frame is encrypted using the first multicast key; and
a receiver address of the individually-addressed frame is an address of the second terminal, wherein the individually-addressed frame is encrypted using a unicast key of the second terminal, and wherein the individually-addressed frame is based on the same multicast packet as the first group-addressed frame; and
for each terminal of the multicast group, only one of the first multicast key or the second multicast key is sent to the respective terminal, wherein the first terminal receives the first multicast key, wherein the second terminal receives the second multicast key and the unicast key, and wherein the second terminal is able to decrypt the individually-addressed frame to receive the multicast packet using the unicast key but is unable to decrypt the first group-addressed frame to receive the multicast packet using the second multicast key.

10. The AP according to claim 9, wherein:
the processing circuit is further configured to generate a second group-addressed frame and a third group-addressed frame based on a to-be-sent broadcast packet; and
the transceiver is further configured to send the second group-addressed frame and the third group-addressed frame;
a receiver address of the second group-addressed frame is a first broadcast address, and the second group-addressed frame is encrypted using the first multicast key; and
a receiver address of the third group-addressed frame is a second broadcast address, and the third group-addressed frame is encrypted using the second multicast key.

11. The AP according to claim 9, wherein:
a plurality of terminals of the first type associated with the AP share the first multicast key.

12. The AP according to claim 9, wherein:
a plurality of terminals of the second type associated with the AP share the second multicast key.

13. A system, comprising:
an access point (AP); and
a plurality of terminals, the plurality of terminals comprising a first terminal and a second terminal, the plurality of terminals being comprised in a multicast group;
wherein the AP is configured to:
  generate a first group-addressed frame and an individually-addressed frame based on a multicast packet to be sent to the plurality of terminals in the multicast group; and
  send the first group-addressed frame and the individually-addressed frame;
wherein:
  a type of the first terminal is a first type, a multicast key of any terminal of the first type that associates with the AP is a first multicast key, a type of the second terminal is a second type, a multicast key of any terminal of the second type that associates the AP is a second multicast key, and the first multicast key and the second multicast key are different;
  a receiver address of the first group-addressed frame is a group address of the multicast group, and the first group-addressed frame is encrypted using the first multicast key;
  a receiver address of the individually-addressed frame is an address of the second terminal, wherein the individually-addressed frame is encrypted using a unicast key of the second terminal, and wherein the individually-addressed frame is based on the same multicast packet as the first group-addressed frame; and
  for each terminal of the multicast group, only one of the first multicast key or the second multicast key is sent to the respective terminal, wherein the first terminal receives the first multicast key, wherein the second terminal of the multicast group receives the second multicast key and the unicast key, and wherein the second terminal is able to decrypt the individually-addressed frame to receive the multicast packet using the unicast key but is unable to decrypt the first group-addressed frame to receive the multicast packet using the second multicast key.

14. The system according to claim 13, wherein the AP is further configured to:
generate a second group-addressed frame and a third group-addressed frame based on a to-be-sent broadcast packet; and
send the second group-addressed frame and the third group-addressed frame;
wherein:
  a receiver address of the second group-addressed frame is a first broadcast address, and the second group-addressed frame is encrypted using the first multicast key; and
  a receiver address of the third group-addressed frame is a second broadcast address, and the third group-addressed frame is encrypted using the second multicast key.

15. The system according to claim 14, wherein:
a plurality of terminals of the first type associated with the AP share the first multicast key; or
a plurality of terminals of the second type associated with the AP share the second multicast key.

16. The system according to claim 14, wherein a plurality of terminals of the first type associated with the AP share the first multicast key.

17. The system according to claim 14, wherein a plurality of terminals of the second type associated with the AP share the second multicast key.

18. The system according to claim 13, wherein:
a plurality of terminals of the first type associated with the AP share the first multicast key; or
a plurality of terminals of the second type associated with the AP share the second multicast key.

19. The system according to claim 13, wherein a plurality of terminals of the first type associated with the AP share the first multicast key.

20. The system according to claim 13, wherein a plurality of terminals of the second type associated with the AP share the second multicast key.

* * * * *